No. 830,729. PATENTED SEPT. 11, 1906.
F. W. MANN.
TELESCOPE MOUNT FOR RIFLES.
APPLICATION FILED NOV. 14, 1904.

2 SHEETS—SHEET 1.

Witnesses:
H. B. Davis
Maud M. Piper

Inventor:
F. W. Mann.
by Roy & Harriman
attys.

UNITED STATES PATENT OFFICE.

FRANKLIN W. MANN, OF MILFORD, MASSACHUSETTS.

TELESCOPE-MOUNT FOR RIFLES.

No. 830,729. Specification of Letters Patent. Patented Sept. 11, 1906.

Application filed November 14, 1904. Serial No. 232,596.

*To all whom it may concern:*

Be it known that I, FRANKLIN W. MANN, of Milford, county of Worcester, State of Massachusetts, have invented an Improvement in Telescope-Mounts for Rifles, of which the following description, in connection with the accompanying drawings, is a specification, like characters on the drawings representing like parts.
This invention relates to telescope-mounts for rifles, and has for its object to construct a mount which is excessively rigid and by its certainty of position is not susceptible to shocks or jars and which provides for the easy removal of the telescope from the mount and also for the replacement of the same to the correct position with certainty. It also provides for the easy removal of the mount itself from the rifle and its replacement thereon to the exact position as before without the aid of any tool. It also provides for the transference of the mount from one rifle to another without tools, and in every instance the mount will find positively the same position on the respective barrels as before, and because the mount has but one lateral position and cannot be placed in any other than this position no sighting up is required for either rifle after sighting up has once been performed.

This invention allows the mount to be attached at any position or changed to any position on the rifle-barrel between the muzzle and the breech without disfigurement of the barrel, because there are no slots, screw-holes, solder, or rings which determine its position. The mount comprehends a micrometer elevating-screw with a powerful clamping device for holding said screw in whatever position it may be set and a large graduated head on the elevating-screw and means for determining the position of said head, whereby manipulation of the screw is convenient and its reading distinct, and which, furthermore, by its micrometer principle enables the use of a short telescope, which is sometimes very much desired.

Figure 1:
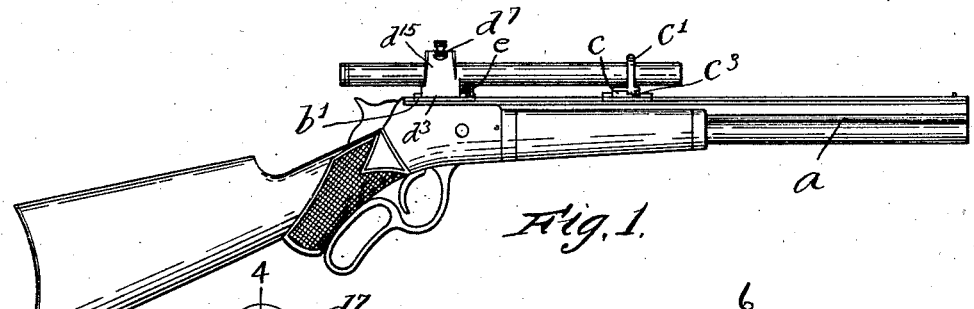
Figure 2:
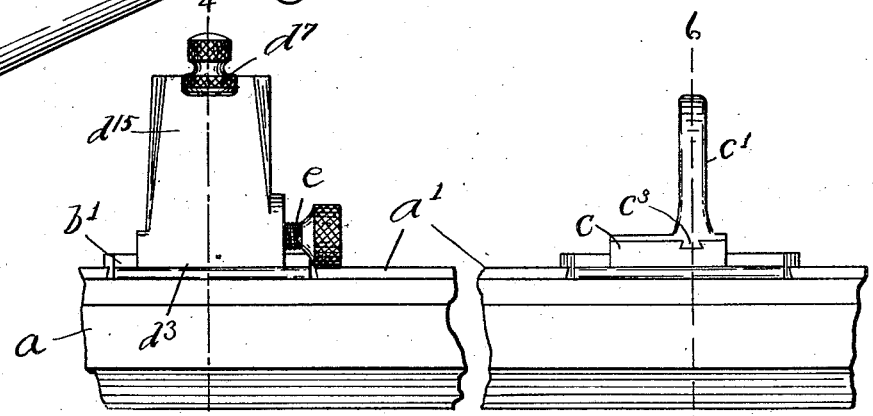
Figure 3:
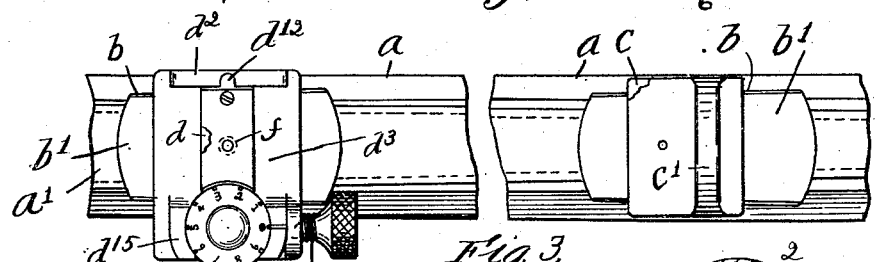
Figures 4, 5, 6, 7:
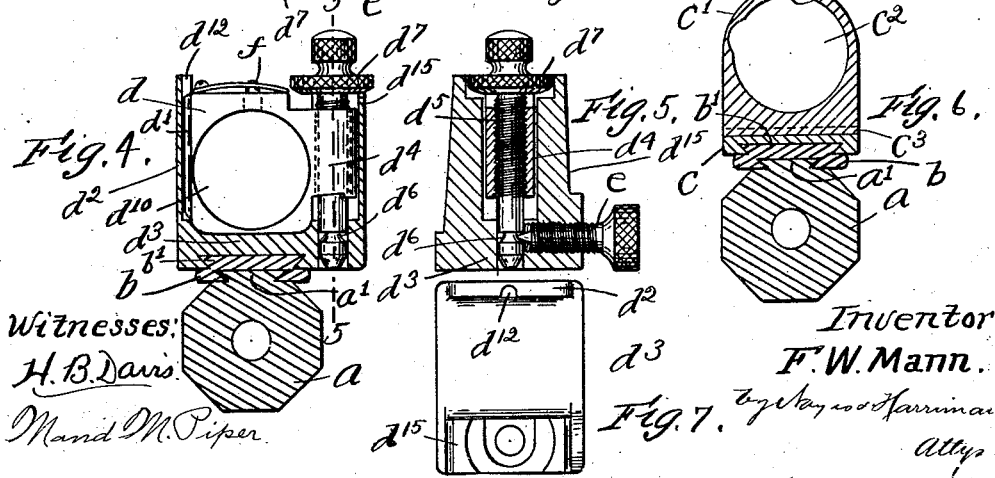
Figure 8:
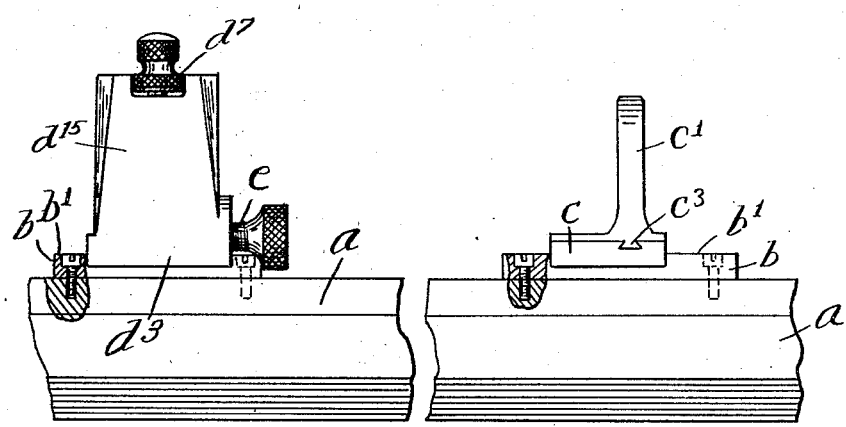
Figure 9:
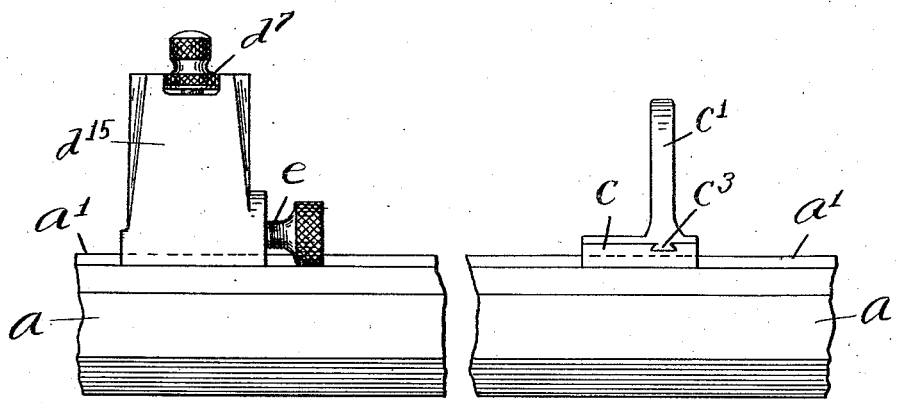

Figure 1 shows in side elevation a rifle and mount thereon embodying this invention bearing a telescope. Fig. 2 is a full-sized elevation of the mount on the barrel, the telescope being removed. Fig. 3 is a plan view of the mount shown in Fig. 2. Fig. 4 is a vertical section of the rear mount and barrel, taken on the dotted line 4 4, Fig. 2. Fig. 5 is a vertical section of the rear mount, taken on the dotted line 5 5, Fig. 4. Fig. 6 is a vertical section of the front mount and barrel, taken on the dotted line 6 6, Fig. 2. Fig. 7 is a plan view of the frame of the rear mount, and Figs. 8 and 9 are modifications to be referred to.

$a$ represents the rifle-barrel. On the top of the barrel $a$ a dovetailed rib $a'$ is formed or provided—as, for instance, it may be formed by cutting the barrel or may be made as a strip attached to the barrel. This dovetailed rib $a'$, conforming to the barrel, is slightly tapering from end to end, being wider at the breech than at the muzzle. The dovetailed rib $a'$ therefore becomes a permanent or fixed element and can be produced by machine when the barrel is manufactured or subsequently.

On top of the barrel and tightly fitting the dovetailed rib thereon are two chairs—one for the front mount and the other for the rear mount—said chairs each being shown as a flat plate $b$, formed upon its under side with a dovetailed groove from end to end, adapted to receive the tapering dovetailed rib $a'$ on the barrel. The chairs of the front and rear mounts are made separate and are adapted to be slid onto the dovetailed rib on the barrel and then driven on hard, so as to be very firmly and permanently secured to the barrel. Each chair $b$ has formed upon its upper side a dovetailed rib $b'$, which is made tapering from end to end, being made widest at the muzzle end, and the front and rear mounts are slidably mounted upon said chairs. The chairs being driven firmly onto the dovetailed rib on the barrel are as permanently secured as if a part thereof; but the front and rear mounts, or either of them, may be easily removed from the chairs whenever desired by sliding them along in the direction of the length of the chair which supports it, The front mount (see Figs. 1 and 6) consists of a base $c$, having a tapering dovetailed groove formed in its under side, which receives the tapering dovetailed rib $b'$ on the chair, and a telescope-receiving block $c'$, rising from said base, having a circular hole $c^2$ through it for the telescope, said block having a dove-tailed rib $c^3$ at the bottom, which enters a transversely-disposed dovetailed groove formed in the top of the base $c$. This transverse dovetailed connection is used solely for the lateral lining up of the sights. The block $c'$ is driven onto the base $c$ and after being accurately lined up with the rear mount is riveted to the base $c$, making $c$ and $c'$ as if made of one piece, and as such is removably placed upon the chair.

The rear mount consists of a telescope-receiving block $d$, having a circular hole $d^{14}$ through it for the telescope and having at one side a vertical guide-rib $d'$, which enters and slides freely in a vertical guideway $d^{12}$, formed in an upright post or side piece $d^2$, rising from a base $d^3$, which latter has a dovetailed groove on its under side adapted to receive the dovetailed rib $b'$ on the chair. The base $d^3$ also has rising from it at the side opposite said guideway a vertical side piece or portion $d^{15}$, which is recessed to receive a lateral extension $d^4$ on the block $d$. A threaded hole is formed vertically through said extension, which receives a screw $d^5$, the lower end of which is formed with an annular groove $d^6$ and the upper end with a graduated head $d^7$. By turning this screw the block $d$ will be raised and lowered. A screw $e$ projects through a threaded hole in the side of the piece $d$ near the bottom, having a pointed end which enters at the lower side of the annular groove in the screw $d^5$ and draws said screw $d^5$ downward and fixes it in a vertical position. This rear mount can be easily removed by sliding it along on the chair whenever desired and also can be applied to a like chair on another rifle.

The mechanism of the rear mount permits of an easy adjustment for elevation in a few seconds and can be then securely clamped.

The telescope which is placed in the receiving-block has at its forward end a projection or spline which enters a recess 2, formed in the circular opening of the front mount to thereby retain the telescope in an upright position, and the rear end of the telescope is held in place, yet free to slide endwise by a spring-pressed pin $f$, passing through a small hole in the block $d$. The telescope can be easily removed whenever desired without disturbing the mounts.

In lieu of using the chairs $b$ it is obvious that the mounts may be placed directly upon the barrel, the dovetail grooves in the bottoms of the mounts engaging the dovetailed rib on the barrel, as shown in Fig. 9, and, furthermore, the chairs may be secured to the barrel by other means than the longitudinal dovetailed groove on the barrel—as, for instance, they may be screwed to the barrel, as shown in Fig. 8. Therefore I do not desire to limit my invention to the particular construction of parts as herein shown.

Having thus described my invention, what I claim as new, and desire to secure by Letters Patent, is—

1. A telescope-mount for rifles consisting of a longitudinal dovetailed tapering rib on the barrel, chairs thereon and telescope-receivers placed on said chairs, substantially as described.

2. A telescope-mount for rifles consisting of a longitudinal dovetailed rib on the barrel tapering from end to end thereof, chairs thereon having longitudinal dovetailed ribs and removable telescope-receivers slidably engaging said chairs, substantially as described.

3. A rifle-barrel having a longitudinal dovetailed rib tapering inward from the muzzle to the breech and supporting the sight, substantially as described.

4. A rifle-barrel having a longitudinal dovetailed rib, and a chair thereon having a longitudinal dovetailed rib tapering from end to end of said chair adapted to receive and support the sight, substantially as described.

5. A telescope-mount for rifles consisting of a telescope-receiver comprising a base having an upright side portion, a vertical screw supported by said side portion, a telescope-receiving block provided with a spring having a pin extending through the top of said block, said pin designed to bear on and hold the rear end of the telescope in place, said block supported by and mounted on said screw, an annular groove in said screw, and a set-screw designed to enter said groove, said receiving-block also provided with a guide-rib designed to slide in a guideway in the rear mount of the rifle, substantially as described.

6. A telescope-mount for rifles consisting of a telescope-receiver comprising a base having an upright side portion, a vertical screw supported by said side portion, a telescope-receiving block mounted on and supported by said screw, an annular groove formed in said screw, and a set-screw which enters said groove, said receiving-block also provided with a guide-rib, designed to slide in a guideway in the rear mount, substantially as described.

In testimony whereof I have signed my name to this specification in the presence of two subscribing witnesses.

FRANKLIN W. MANN.

Witnesses:
J. E. WALKER,
P. L. WALKER.